2,989,535
IMIDAZOLE DYESTUFFS OF THE ANTHRAQUINONE SERIES

Hermann Geeren, Ludwigshafen (Rhine), Friedrich Ebel, Mannheim-Feudenheim, and Willy Braun, Heidelberg, Germany, assignors to Badische Anilin- & Soda-Fabrik Aktiengesellschaft, Ludwigshafen (Rhine), Rhineland-Pfalz, Germany
No Drawing. Filed Aug. 6, 1959, Ser. No. 831,944
Claims priority, application Germany Aug. 8, 1958
7 Claims. (Cl. 260—309.2)

This invention relates to new imidazole dyestuffs of the anthraquinone series and to a process for their production.

The imidazole dyestuffs of the anthraquinone series hitherto known from the literature have various defects, for example inadequate wet fastness properties and/or small color strength.

It has therefore been a problem to find and prepare new imidazole dyestuffs of the anthraquinone series which would not have these defects and which at the same time would be characterized by the clarity and fastness to light of the known imidazole dyestuffs of the anthraquinone series.

This problem has been solved in accordance with the present invention by the production of vat dyestuffs which correspond to the general formula:

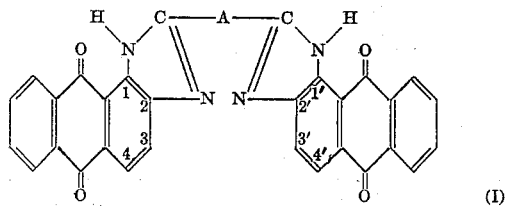

wherein each of the two anthraquinone systems may contain in the 3- or 4-position or in the 3'- or 4'-position halogen atoms, for example chlorine or bromine atoms, or alkoxy groups, for example low molecular weight alkoxy groups, i.e. lower alkoxy groups such as methoxy or ethoxy groups, and A represents a phenylene radical which in turn may bear the same halogen atoms or alkoxy groups.

New dyestuffs of special technical interest are those which have the general formula:

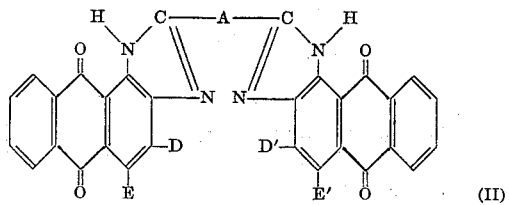

in which D, D', E and E' may be identical or different and each stands for a hydrogen atom, a halogen atom, preferably chlorine and bromine, or an alkoxy group, preferably a lower alkoxy group such as a methoxy or an ethoxy group, and A represents a meta- or para-phenylene radical in which up to two hydrogen atoms are replaced by the above-mentionel halogen atoms or alkoxy groups. The process for the production of these particular dyestuffs is also of special technical interest.

We have now found according to this invention that the above valuable vat dyestuffs with very good wet fastness properties are obtained by reacting a 1,2-diaminoanthraquinone which may contain halogen atoms or alkoxy groups in the 3- or 4-position, with a compound of the general formula $X_1$—A—$X_2$ in which $X_1$ and $X_2$ each represents a HOOC—, ROOC—,

$Y_2HC$- or $Y_3C$-group, Y being a halogen atom and R a simple alkyl, aralkyl or aryl radical, and A represents a phenylene radical which in turn may bear halogen atoms or alkoxy groups.

Examples of 1,2-diaminoanthraquinones which have halogen atoms or alkoxy groups in 3- or 4-position are 1,2 - diamino - 3 - methoxyanthraquinone, 1,2 - diamino-3-bromanthraquinone or 1,2-diamino-4-chloranthraquinone. Chlorine or bromine atoms are examples of halogen atoms. Lower alkoxy groups, such as methoxy or ethoxy groups, are preferred. Methyl, ethyl, benzyl or phenyl radicals are examples of simple alkyl, aralkyl or aryl radicals.

Examples of compounds of the general formula $X_1$—A—$X_2$ are: benzene dicarboxylic acids, as for example terephthalic acid, chlorterephthalic acid, 2,5-dichlorterephthalic acid, 2,5-dibromoterephthalic acid, 2,5-dimethoxyterephthalic acid, isophthalic acid, 4,6-dichlorisophthalic acid, 4,6-dibromisophthalic acid; and the esters and acid halides of benezene dicarboxylic acids or benzene dialdehydes, as for example terephthalaldehyde, 2,5-dichlorterephthalaldehyde, 2,5 - dibromoterephthalaldehyde, isophthalaldehyde, 4,6-dichlorisophthalaldehyde, trichlorisophthalaldehyde, tetrachlorisophthalaldehyde; and also the omega-halogenated xylenes, as for example omega, omega,omega',omega' - tetrachlor - para-xylene, omega,omega,omega',omega' - tetrabrom - para - xylene, 2,5 - omega,omega,omega',omega' - hexachlor - para-xylene, 2,5 - omega,omega,omega',omega' - hexabrom-para - xylene, 2,3,5,6 - omega,omega, omega',omega'-octachlor - para - xylene, omega,omega,omega',omega'-tetrabrom - meta - xylene, 2,4 - omega,omega, omega', omega' - hexachlor - meta - xylene, 1,4 - bistrichlormethylbenzene, 4,6 - dichlor - 1,3 - bis - trichlormethylbenzene, 2,5 - omega,omega,omega,omega',omega'- heptachlor-para-xylene.

The new vat dyestuffs are obtained in the known manner for the production of imidazoles as described in the literature, e.g. by condensation of one mol of a compound of the general formula $X_1$—A—$X_2$, in which A, $X_1$ and $X_2$ have the meanings given above, with 2 to 2.2 mols of 1,2-diaminoanthraquinones of the above-mentioned kind, preferably in a solvent and/or diluent. It is often helpful to include in the reaction an agent for binding water or acid, generally called acid-binding or water-binding agents. It is possible to start either from one 1,2-diaminoanthraquinone or from different 1,2-diaminoanthraquinones which are condensed simultaneously or successively with the above-mentioned compounds of the above general formula $X_1$—A—$X_2$.

Examples of solvents and/or diluents which are at the same time water-binding agents and which are generally suitable are sulfuric acid, sulfuric acid monohydrate and oleum. It is preferred to use at least 80 to 85% sulfuric acid. Especially good results are obtained by working in 99% sulfuric acid. When oleum is used it is preferred to use up to 10% oleum.

The condensation can also be carried out in inert organic solvents and/or diluents, such as nitrobenzene, trichlorobenzene or naphthalene, especially when starting for example from acid chlorides, aldehydes or omega-halogenxylenes. Suitable temperatures for reaction in sulfuric acid and/or sulfuric acid monohydrate are in general 100° to 160° C., and for reaction in organic solvents temperatures of about 150° to 220° C. are suitable. In many cases the reaction takes place immediately during the heating of the reaction mixture up to the said temperatures and is ended when these temperatures have been reached. In other cases the reaction mixture must be kept at these higher temperatures for up to 8 hours if it is desired to achieve a complete condensation of the reactants. The new process is of special technical interest when starting from omega-halogenxylenes and using sulfuric acid or nitrobenzene as solvent.

The dyestuffs according to this invention are characterized, in contrast to the imidazole dyestuffs of the anthraquinone series hitherto known, by a high color strength and they have especially good wet fastness properties. The new imidazole dyestuffs of the anthraquinone series are valuable yellow vat dyestuffs for dyeing and/or printing various structures, such as fibers, threads, flocks, foils, woven or knitted fabrics of native and/or regenerated cellulose. They are also suitable for dyeing synthetic materials, especially linear polyamides.

The following examples will further illustrate this invention but the invention is not restricted to these examples. The parts and percentages are by weight.

*Example 1*

3.5 parts of terephthalic acid are added to a solution of 10 parts of 1,2-diaminoanthraquinone in 100 parts of concentrated sulfuric acid, and the mixture is heated to 150° to 160° C. and kept at this temperature for 8 hours. After cooling, the reaction mixture is poured into ice-water and the deposited precipitate is filtered off by suction, washed until free from acid and dried.

If desired, the dyestuff may also be separated by adjusting the sulfuric acid solution of the dyestuff, by the careful addition of water, to the acid concentration at which the dyestuff separates as the sulfate. By decomposing the sulfate with water, the new dyestuff is obtained in pure form. This kind of separation of a dyestuff from the reaction mixture is termed "fractionation" in the following examples.

The yellow dyestuff obtained in a very good yield has good solubility in concentrated sulfuric acid; but in organic solvents, it is less soluble with a yellow color or is insoluble. The dyestuff dyes cotton yellow shades from a violet-red vat and has the following formula:

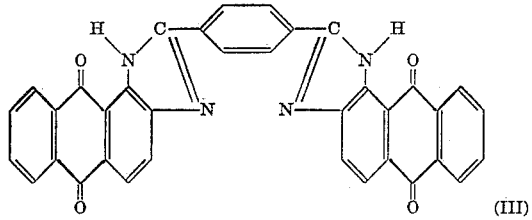

(III)

By starting from 4.2 parts of dimethyl terephthalate instead of from 3.5 parts of terephthalic acid and following the same procedure, the same dyestuff is obtained in a good yield.

*Example 2*

3.5 parts of isophthalic acid are introduced into a solution of 10 parts of 1,2-diaminoanthraquinone in 100 parts of sulfuric acid monohydrate, and the mixture is heated to 150° to 160° C. and kept at this temperature for 1 to 3 hours. After cooling, the reaction mixture is poured into ice-water or the dyestuff is fractionated as described in Example 1. The yellow dyestuff obtained in very good yields is soluble with a yellow color in concentrated sulfuric acid. It is insoluble in organic solvents or dissolves only slightly with a yellow color. The dyestuff dyes cotton yellow shades from an orange-red vat and has the following formula:

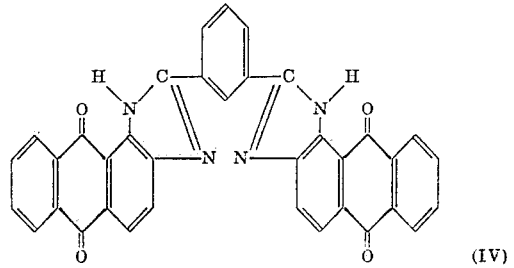

(IV)

*Example 3*

5 parts of 2,5-dichlorterephthalic acid are added to a solution of 10 parts of 1,2-diaminoanthraquinone in 100 parts of sulfuric acid monohydrate, and the mixture heated to 150° to 160° C. and kept at this temperature for 3 hours. After cooling, the reaction mixture is poured into ice-water or the dyestuff fractionated as described in Example 1. The yellow dyestuff obtained in good yields is soluble in sulfuric acid with a yellow color, and insoluble or only slightly soluble in organic solvents. The dyestuff yields a blue-violet vat and has the following formula:

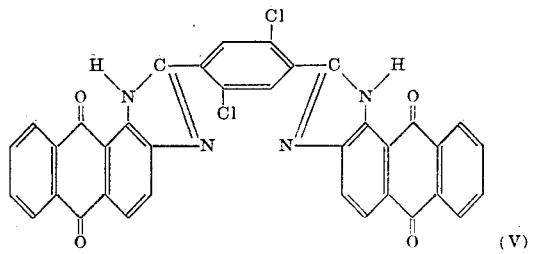

(V)

The dyeing on cotton is yellow.

*Example 4*

6.8 parts of 2,5-dibromoterephthalic acid are introduced into a solution of 10 parts of 1,2-diaminoanthraquinone in 100 parts of sulfuric acid monohydrate, and the mixture heated to 150° to 160° C. and kept at this temperature for 3 hours. After cooling, the reaction mixture is poured into ice-water or the dyestuff fractionated as described in Example 1. The yellow dyestuff obtained in good yields is soluble in sulfuric acid with a yellow color and is insoluble or only slightly soluble in organic solvents. It dyes cotton yellow shades from a violet vat and has the following formula:

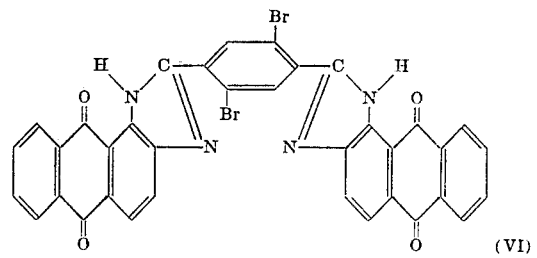

(VI)

*Example 5*

5 parts of 4,6-dichlorisophthalic acid are added to a solution of 10 parts of 1,2-diaminoanthraquinone in 100 parts of sulfuric acid monohydrate, and the mixture heated to 150° to 160° C. and kept at this temperature for 3 hours. After cooling, the reaction mixture is poured into ice-water or the dyestuff fractionated in the way described in Example 1. The yellow dyestuff obtained in a very good yield is soluble in sulfuric acid with a yellow color and is insoluble or only slightly soluble in organic solvents. It yields a red vat. The dyeing on cotton is yellow. The dyestuff has the following formula:

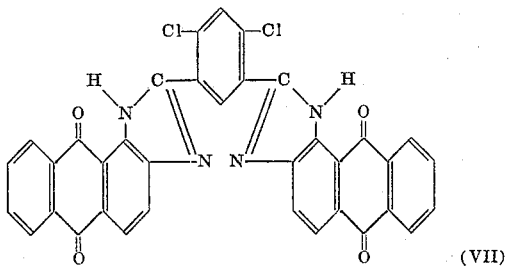

(VII)

Example 6

10 parts of 1,2-diaminoanthraquinone are dissolved in 150 parts of nitrobenzene while heating. Into the solution there are introduced 0.1 part of pyridine and then at 120° C. 4.3 parts of terephtaloyl chloride in small portions. The solution is then heated during the course of 1 to 2 hours at 180° C., kept at this temperature for 1 hour, further heated to 200° C., the temperature kept at 200° C. for 1 hour, and then cooled to 120° C. At this temperature, the reaction product is filtered off by suction, washed with nitrobenzene at 120° C., and then washed free from nitrobenzene with methanol and dried. The dyestuff obtained in a very good yield is identical with the dyestuff prepared according to Example 1.

Example 7

The terephthaloyl chloride in Example 6 is replaced by the same amount of isophthaloyl chloride. A dyestuff is obtained in a very good yield which is identical with the dyestuff obtainable according to Example 2.

Example 8

The procedure of Example 6 is followed but starting from 5.8 parts of 2,5-dichlorterephtaloyl chloride instead of from 4.3 parts of terephtaloyl chloride. A yellow dyestuff is obtained in a good yield which is identical with the dyestuff prepared according to Example 3.

Example 9

10 parts of 1,2-diaminoanthraquinone are dissolved in 200 parts of nitrobenzene while heating. Into the solution there are then introduced 0.1 part of pyridine and then at 120° C. 7.6 parts of 2,5-dibromoterephthaloyl chloride in small portions. The whole is then heated within 1 to 2 hours to 180° C., the temperature kept at 180° C. for 1 hour, further heated to 200° C., the temperature held at 200° C. for 1 hour and then cooled to 120° C. The reaction product is filtered off by suction at 120° C., washed with hot nitrobenzene at the same temperature, and then washed free of nitrobenzene with methanol and dried. The dyestuff obtained in a very good yield is identical with the dyestuff prepared according to Example 4.

Example 10

10 parts of 1,2-diaminoanthraquinone are dissolved in 150 parts of nitrobenzene by heating. 0.1 part of pyridine is added to the solution and then 5.8 parts of 4,6-dichlorisophthaloyl chloride are introduced at 120° C. in small portions. The solution is then heated during 1 to 2 hours to 180° C., the temperature held for 2 hours at 180° C. and then cooled to 120° C. At this last temperature, the reaction product is filtered off by suction, washed with nitrobenzene at 120° C., and then washed free of nitrobenzene with methanol and dried. The dyestuff obtained in a good yield is identical with the dyestuff prepared according to Example 5.

Example 11

10 parts of 1,2-diaminoanthraquinone are dissolved in 200 parts of nitrobenzene while heating. Into the solution there are then introduced 0.1 part of pyridine, and then 5.6 parts of 2,5-dimethoxyterephthaloyl chloride are added at 120° C. in small portions. The solution is then heated within 1 to 2 hours to 180° C., kept at 180° C. for 2 hours and then cooled to 120° C. At this temperature, the reaction product is filtered off by suction, washed with hot nitrobenzene at 120° C., and then washed free of nitrobenzene with methanol and dried. The yellow dyestuff obtained in a good yield is soluble in sulfuric acid; it is insoluble in organic solvents or only slightly soluble with a yellow color. The dyestuff dyes cotton yellow shades from a violet vat and has the following formula:

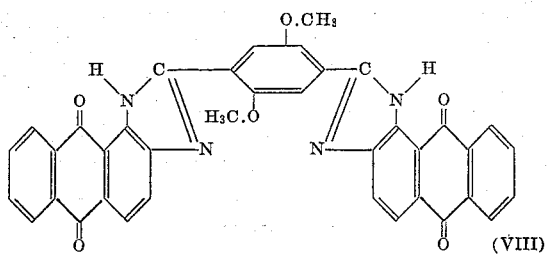

(VIII)

Example 12

10 parts of 1,2-diaminoanthraquinone are dissolved in 100 parts of nitrobenzene while heating. At about 100° C. 2.9 parts of terephthalaldehyde are added in small portions and the solution is heated within 1 to 2 hours to 180° C. and kept at this temperature for an hour. After cooling to 120° C., the reaction product is filtered off by suction, and washed with hot nitrobenzene at 120° C. The dyestuff is then washed free of nitrobenzene with methanol and dried. The dyestuff obtained in a very good yield is identical with the dyestuff prepared according to Example 1 or 6.

Example 13

10 parts of 1,2-diaminoanthraquinone are dissolved in 150 parts of nitrobenzene while heating. At about 100° C., 4.3 parts of 2,5-dichlorterephtalaldehyde are added in small portions, the solution heated within 1 to 2 hours to 180° C. and kept at this temperature for an hour. After cooling to 120° C., the reaction product is filtered off by suction, washed with hot nitrobenzene at 120° C., washed free of nitrobenzene with methanol and dried. The dyestuff obtained in a very good yield is identical with the dyestuff prepared according to Example 3 or 8.

Example 14

The procedure of Example 13 is followed but 200 parts of nitrobenzene are used instead of 150 parts of nitrobenzene and 6.2 parts of 2,5-dibromterephthalaldehyde are used instead of 4.3 parts of 2,5-dichlorterephthalaldehyde. There is obtained in a good yield the same dyestuff as can be obtained according to Example 4 or 9.

Example 15

10 parts of 1,2-diaminoanthraquinone are dissolved in 150 parts of nitrobenzene while heating. At about 150° C. there is introduced into the solution in small portions 6.6 parts of 2,5-omega,omega,omega',omega,-hexachlor-para-xylene, the whole heated in the course of an hour to 180° C., the temperature held for an hour at 180° C., heated to 200° C., the temperature held for an hour at 200° C. and the mixture cooled to 120° C. At this temperature the reaction product is filtered off by suction, washed first with hot nitrobenzene at 120° C., then with methanol until free of nitrobenzene and dried. A dyestuff is obtained in a very good yield which is identical with the dyestuff prepared according to Example 3, 8 or 13.

By replacing the 6.6 parts of 2,5-omega,omega,omega′,omega′-hexachlor-para-xylene by 12.5 parts of 2,5-dichlor-omega,omega,omega′,omega′-tetrabrom-para-xylene, the same dyestuff is obtained in a very good yield.

Example 16

The 2,5-omega,omega,omega′,omega′-hexachlor-para-xylene in Example 15 is replaced by 12.2 parts of 2,5-omega,omega,omega′,omega′-hexabrom-para-xylene. A dyestuff is obtained in a very good yield which is identical with the dyestuff prepared according to Example 4, 9 or 14.

Example 17

8.9 parts of omega,omega,omega′,omega′-tetrabrom-meta-xylene are added to a solution of 10 parts of 1,2-diamino-anthraquinone in 100 parts of sulfuric acid monohydrate, the mixture heated to 125° to 130° C. and kept for 2 hours at this temperature. After cooling, the reaction mixture is poured into ice-water or the dyestuff fractionated as described in Example 1. The dyestuff obtained in a very good yield is identical with the dyestuff prepared according to Example 2 or 7.

Example 18

6.6 parts of 2,5-omega,-omega,omega′,omega′-hexachlor-para-xylene are introduced into a solution of 10 parts of 1,2-diamino-anthraquinone in 100 parts of sulfuric acid monohydrate, the mixture heated to 100° C. and kept at this temperature for 2 hours. After cooling, the reaction mixture is poured into ice-water or the dyestuff is fractionated as described in Example 1. A dyestuff is obtained in a very good yield which is identical with the dyestuff prepared according to Example 3, 8, 13 or 15.

By replacing the 1,2-diaminoanthraquinone with the same weight of 1,2-diamino-3-methoxyanthraquinone and using 5.9 parts of 2,5-omega,omega,omega′,omega′-hexachlor-para-xylene, a yellow dyestuff is obtained in a very good yield which is soluble in sulfuric acid with a yellow color. The new dyestuff dyes cotton yellow shades from a blue-violet vat and has the following formula:

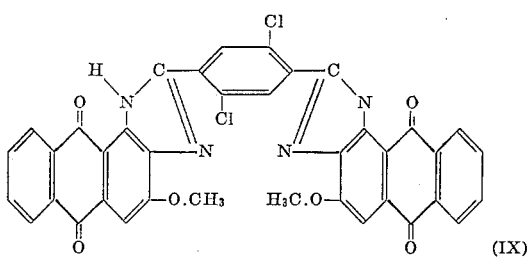

(IX)

By replacing the 1,2-diaminoanthraquinone with the same weight of 1,2-diamino-4-chloranthraquinone and using 5.8 parts of 2,5-omega-omega,omega′,omega′-hexachlor-para-xylene, a yellow deystuff is obtained in a good yield which dissolves well in concentrated sulfuric acid with a yellow color. The new dyestuff dyes cotton yellow shades from a blue-violet vat and has the following formula:

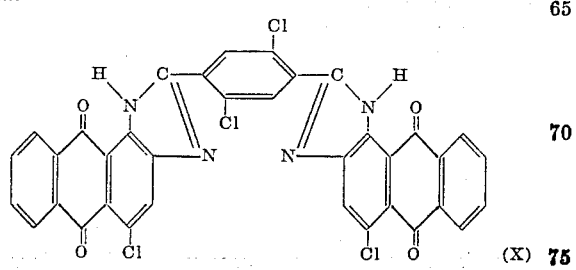

(X)

Example 19

By following the procedure of Example 18 but starting from 10 parts of 1,2-diamino-3-bromanthraquinone instead of 1,2-diaminoanthraquinone and 4.8 parts of 2,5-omega,omega,omega′,omega′-hexachlor-para - xylene instead of 6.6 parts, a yellow dyestuff is obtained in a very good yield which dissolves well in concentrated sulfuric acid. The new dyestuff is insoluble in organic solvents or only slightly soluble with a yellow color and dyes cotton yellow shades from a violet vat. The dyestuff has the following formula:

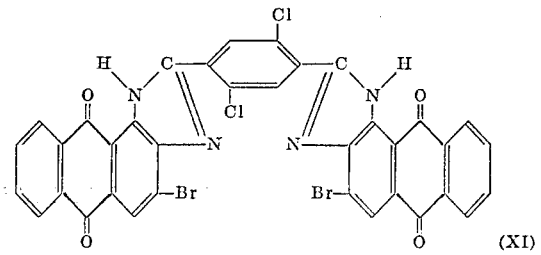

(XI)

Example 20

3.5 parts of terephthalic acid are intdoduced into a solution of 5 parts of 1,2-diaminoanthraquinone and 5.7 parts of 1,2-diamino-3-bromanthraquinone in 120 parts of sulfuric acid monohydrate, the mixture heated to 150° C. and kept at this temperature for 1 to 3 hours. After cooling, the reaction mixture is poured into ice-water or the dyestuff fractionated as described in Example 1. The yellow dyestuff obtained in a very good yield is soluble in concentrated sulfuric acid with a yellow color. The dyestuff dyes cotton yellow shades from a red vat.

Example 21

3.5 parts of terephthalic acid are introduced into a solution of 5 parts of 1,2-diaminoanthraquinone in 120 parts of sulfuric acid monohydrate, the mixture heated for 1 to 3 hours at 150° C., 6.7 parts of 1,2-diamino-3-bromanthraquinone introduced and kept for a further 1 to 3 hours at 150° C. After cooling, the reaction mixture is poured into ice-water or the dyestuff fractionated as described in Example 1. The yellow dyestuff obtained in a very good yield is soluble in concentrated sulfuric acid with a yellow color. The dyestuff dyes cotton yellow shades from a red vat and has the following formula:

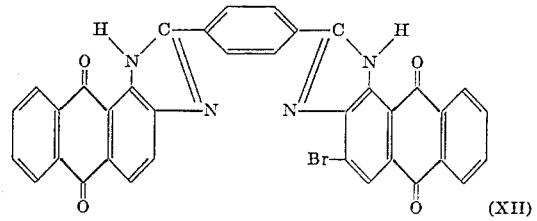

(XII)

By replacing the 3.5 parts of tetrephthalic acid by 6.6 parts of 2,5-omega,omega,omega′,omega′-hexachlor-para-xylene, a dyestuff is obtained in a very good yield which dissolves well in concentrated sulfuric acid with a yellow color. The dyestuff dyes cotton yellow shades from a blue-violet vat and has the following formula:

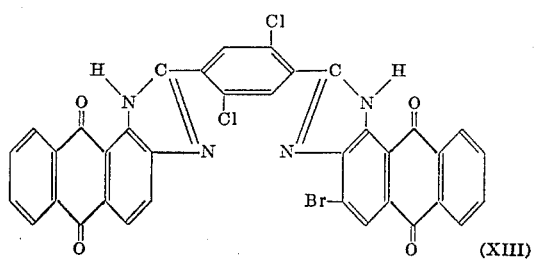

(XIII)

We claim:
1. A dyestuff of the formula:

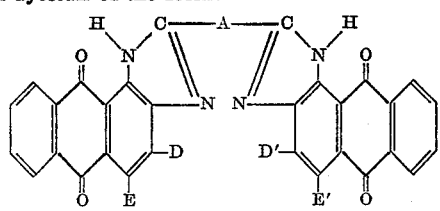

in which each of D, D', E and E' represents a nonvalent substituent selected from the class consisting of hydrogen chlorine, bromine and lower alkoxy, and wherein A represents a divalent radical selected from the class consisting of unsubstituted meta- and para-phenylene and meta- and para-phenylene containing up to two monovalent substituents selected from the class consisting of chlorine and bromine.

2. The dyestuff of the formula:

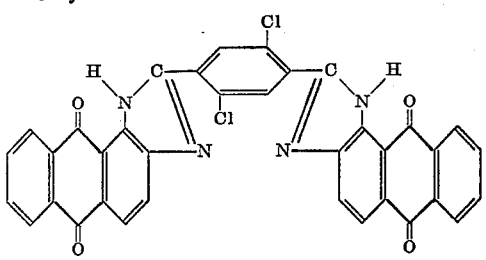

3. The dyestuff of the formula:

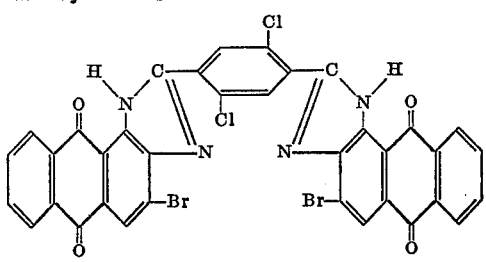

4. The dyestuff of the formula:

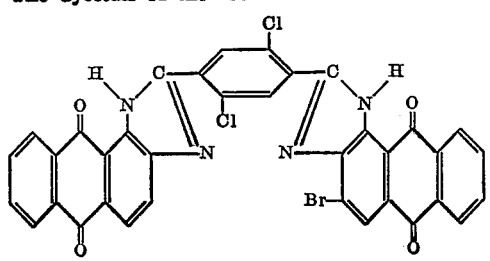

5. The dyestuff of the formula:

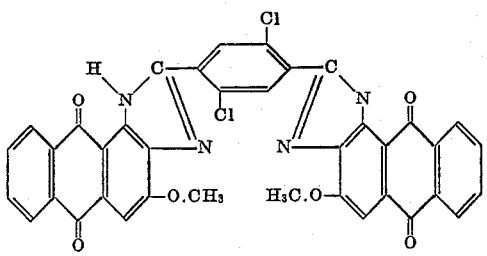

6. The dyestuff of the formula:

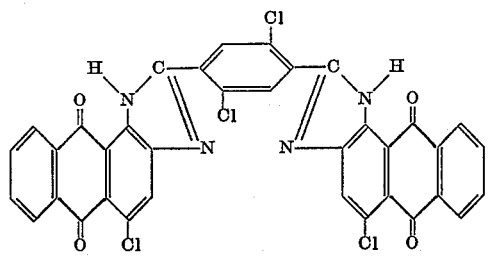

7. The dyestuff of the formula:

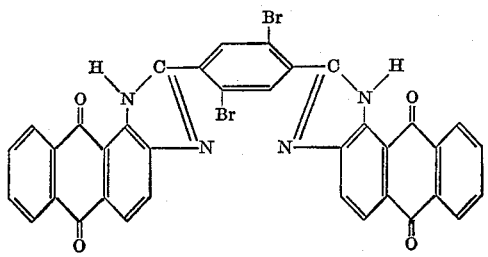

References Cited in the file of this patent
UNITED STATES PATENTS

| | | |
|---|---|---|
| 1,022,781 | Friedmann | Apr. 9, 1912 |

FOREIGN PATENTS

| | | |
|---|---|---|
| 251,480 | Germany | Oct. 8, 1912 |
| 591,980 | Great Britain | Sept. 3, 1947 |

OTHER REFERENCES

Beilstein (Handbuch, 4th Ed.), vol. 27, 2nd Sup., p. 908 (1955).

UNITED STATES PATENT OFFICE
CERTIFICATE OF CORRECTION

Patent No. 2,989,535                     June 20, 1961

Hermann Geeren et al.

It is hereby certified that error appears in the above numbered patent requiring correction and that the said Letters Patent should read as corrected below.

Column 10, lines 7 to 12, the right-hand portion of the formula should appear as shown below instead of as in the patent:

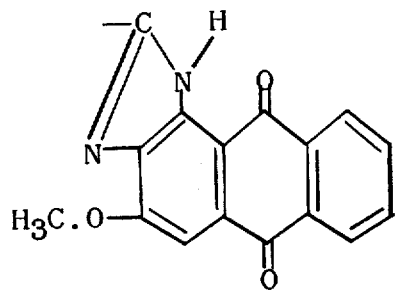

Signed and sealed this 2nd day of January 1962.

(SEAL)
Attest:

ERNEST W. SWIDER
Attesting Officer

DAVID L. LADD
Commissioner of Patents